US011379135B2

(12) United States Patent
Thor et al.

(10) Patent No.: US 11,379,135 B2
(45) Date of Patent: Jul. 5, 2022

(54) MEMORY PROTECTION UNIT

(71) Applicant: Honeywell International Inc., Morris Plains, NJ (US)

(72) Inventors: Ralf Peter Thor, Baden-Wuerttemberg (DE); François Germain Vincent, Niedernhausen (DE); Roland Domke, Hessen (DE); Ionut Nicorescu, Timisoara (RO)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 16/947,501

(22) Filed: Aug. 4, 2020

(65) Prior Publication Data
US 2022/0043591 A1 Feb. 10, 2022

(51) Int. Cl.
*G06F 3/06* (2006.01)

(52) U.S. Cl.
CPC .......... *G06F 3/0637* (2013.01); *G06F 3/0604* (2013.01); *G06F 3/0659* (2013.01); *G06F 3/0673* (2013.01)

(58) Field of Classification Search
CPC .... G06F 3/0637; G06F 3/0659; G06F 3/0604; G06F 3/0673
See application file for complete search history.

(56) References Cited

U.S. PATENT DOCUMENTS

| 9,581,488 | B2 | 2/2017 | Brrang | |
| 10,102,391 | B2* | 10/2018 | Sharp | G06T 1/60 |
| 2010/0070273 | A1* | 3/2010 | Rodriguez | G10L 15/26 |
| | | | | 704/231 |
| 2018/0267726 | A1* | 9/2018 | Sun | G06F 3/0622 |
| 2020/0210077 | A1* | 7/2020 | Keeth | G06F 3/0673 |
| 2021/0056207 | A1* | 2/2021 | Tiwari | G06F 9/4406 |
| 2021/0089684 | A1* | 3/2021 | Cui | G06F 21/6218 |
| 2021/0232337 | A1* | 7/2021 | Talvitie | G06F 21/79 |

FOREIGN PATENT DOCUMENTS

EP 2187173 A1 5/2010

OTHER PUBLICATIONS

Sebest, "Relevant and Non-Relevant Code Separation with Kinetis M", Freescale Semiconductor, Inc., Document No. AN5141 (Jun. 2015) (24 pages total).
Circello, et al., "Kinetis M Support for Distinct Separation of Legally Relevant Software", Freescale Semiconductor, Inc. (2013) (4 pages total) Retrieved from: https://www.smart-energy.com/wp-content/uploads/i/Freescale_whitepaper.pdf Retrieved on: May 13, 2019.

* cited by examiner

*Primary Examiner* — Sean D Rossiter
(74) *Attorney, Agent, or Firm* — John Maldjian; Stevens & Lee PC

(57) ABSTRACT

One implementation is for a device. The device includes a controller having a memory protection unit, a legally relevant memory portion capable of interacting with the controller, a legally non-relevant memory portion capable of interacting with the controller, an interface in the memory protection unit that allows a privileged application to access the legally relevant memory portion and disallows an unprivileged application to access to the legally relevant portion, and an interrupt system, wherein when the unprivileged application makes an attempt to interact with the legally relevant memory portion, the memory protection unit takes an action associated with the unprivileged application.

14 Claims, 7 Drawing Sheets

MEMORY PROTECTION UNIT

BACKGROUND

Embedded systems are becoming more and more connected over time and have become one of a multitude of devices in the "Internet of Things". Some of these devices, such as measuring instruments or smart meters, gain immense value by having a high level of connectivity. These devices must also be highly secure and trusted to produce accurate and essentially-incorruptible results. Practically speaking, the parties being affected by the measuring instrument cannot check the results and, hence, they must be able to rely on its accuracy at a very-high level.

One solution is to separate legally relevant and legally non-relevant data and operate a device that has two micro-controllers. One of the micro-controllers is dedicated to the legally relevant functionality and one of the micro-controllers is dedicated to the legally non-relevant functionality. This allows at least the portion of the device running the legally relevant system to be secure and safe from tampering. Typically, the legally relevant portion of the system cannot be upgraded while the legally non-relevant portion allows for remote firmware upgrades. This is a less than optimal solution. Multiple micro-controllers require more PCB space, consume more power, and offer less flexibility.

It would be desirable for a system that has 1) a single micro-controller that is capable of handling both legally relevant and legally-non relevant applications; and 2) has the inherent security and trustworthiness while also being expandable to adapt to the ever changing needs of the "Internet of Things".

SUMMARY

One implementation is for a device. The device includes a controller having a memory protection unit, a legally relevant memory portion capable of interacting with the controller, a legally non-relevant memory portion capable of interacting with the controller, an interface in the memory protection unit that allows a privileged application to access the legally relevant memory portion and disallows an unprivileged application to access to the legally relevant portion, and an interrupt system, wherein when the unprivileged application makes an attempt to interact with the legally relevant memory portion, the memory protection unit takes an action associated with the unprivileged application.

Another implementation includes one or more hardware-based non-transitory memory devices storing computer-readable instructions which, when executed by the one or more processors disposed in a computing device, cause the computing device to enable an interaction between a controller and a legally relevant portion using a memory protection unit, enable an interaction between the controller and a legally non-relevant portion using the memory protection unit, allow a privileged application to access the legally relevant portion, receive an attempt from the unprivileged application to access the legally relevant portion, and perform at least one action with respect to the unprivileged application.

Another implementation is for a method for protecting a device. The method includes enabling an interaction between a controller and a legally relevant portion using a memory protection unit, enabling an interaction between the controller and a legally non-relevant portion using the memory protection unit, allowing a privileged application to access the legally relevant portion, receiving an interrupt from an unprivileged application configured to interact with the legally relevant portion, and performing an operating system level response to the interrupt.

DETAILED DESCRIPTION OF THE INVENTION

Figure 1:
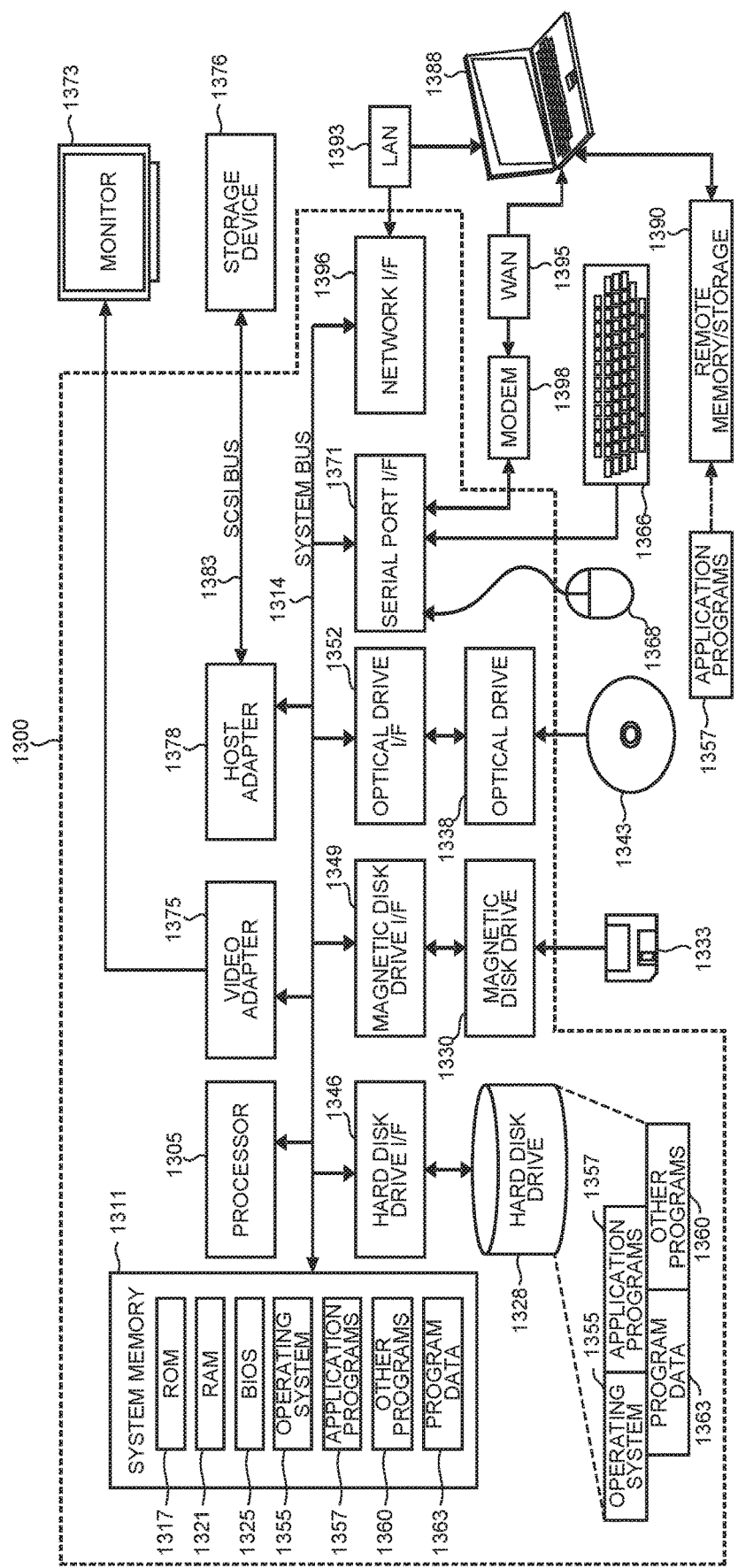
FIG. 1 is a simplified block diagram of a computer system which can be used to implement a memory protection unit.

FIG. 1 is a simplified block diagram of a computer system which can be used to implement a memory protection unit. In one example, the computer system 1300 includes a processor 1305, a system memory 1311 (which can also include the memory protection unit), and a system bus 1314 that couples various system components including the system memory 1311 to the processor 1305. The system bus 1314 may be any of several types of bus structures, including a memory bus or memory controller, a peripheral bus, or a local bus using any of a variety of bus architectures. The system memory 1311 includes read only memory (ROM) 1317 and random-access memory (RAM) 1321. A basic input/output system (BIOS) 1325, containing the basic routines that help to transfer information between elements within the computer system 1300, such as during startup, is stored in ROM 1317. The computer system 1300 may further include a hard disk drive 1328 for reading from and writing to an internally disposed hard disk (not shown), a magnetic disk drive 1330 for reading from or writing to a removable magnetic disk 1333 (e.g., a floppy disk), and an optical disk drive 1338 for reading from or writing to a removable optical disk 1343 such as a CD (compact disc), DVD (digital versatile disc), or other optical media. The hard disk drive 1328, magnetic disk drive 1330, and optical disk drive 1338 are connected to the system bus 1314 by a hard disk drive interface 1346, a magnetic disk drive interface 1349, and an optical drive interface 1352, respectively. The drives and their associated computer-readable storage media provide non-volatile storage of computer-readable instructions, data structures, program modules, and other data for the computer system 1300.

Although this illustrative example includes a hard disk, a removable magnetic disk 1333, and a removable optical disk 1343, other types of computer-readable storage media, which can store data accessible by a computer such as magnetic cassettes, Flash memory cards, digital video disks, data cartridges, random access memories (RAMs), read only memories (ROMs), and the like, may also be used in some applications of the present use of a memory protection unit. In addition, as used herein, the term computer-readable storage media includes one or more instances of a media type (e.g., one or more magnetic disks, one or more CDs, etc.). For purposes of this specification and the claims, the phrase "computer-readable storage media" and variations thereof, are intended to cover non-transitory embodiments, and do not include waves, signals, and/or other transitory and/or intangible communication media.

A number of program modules may be stored on the hard disk, magnetic disk 1333, optical disk 1343, ROM 1317, or RAM 1321, including an operating system 1355, one or more application programs 1357, other program modules 1360, and program data 1363. A user may enter commands and information into the computer system 1300 through input devices such as a keyboard 1366 and pointing device 1368 such as a mouse. Other input devices (not shown) may include a microphone, joystick, game pad, satellite dish, scanner, trackball, touchpad, touchscreen, touch-sensitive device, voice-command module or device, user motion or user gesture capture device, or the like. Additional input devices (not shown) can include both privileged and unprivileged devices, including but not limited to: a P0 comm interface, a P1 comm interface, a P3 comm interface, an integrated breaker, a relay, an external metrologic chip including sensors, a metrologic LED, an LCD, a button, an external FLASH memory, a tamper sensor, a power supply, a client breaker, and a downstream voltage.

These and other input devices are often connected to the processor 1305 through a serial port interface 1371 that is coupled to the system bus 1314, but may be connected by other interfaces, such as a parallel port, game port, or universal serial bus (USB). A monitor 1373 or other type of display device is also connected to the system bus 1314 via an interface, such as a video adapter 1375. In addition to the monitor 1373, personal computers typically include other peripheral output devices (not shown), such as speakers and printers. The illustrative example shown in FIG. 1 also includes a host adapter 1378, a Small Computer System Interface (SCSI) bus 1383, and an external storage device 1376 connected to the SCSI bus 1383.

The computer system 1300 is operable in a networked environment using logical connections to one or more remote computers, such as a remote computer 1388. The remote computer 1388 may be selected as another personal computer, a server, a router, a network PC, a peer device, or other common network node, and typically includes many or all of the elements described above relative to the computer system 1300, although only a single representative remote memory/storage device 1390 is shown in FIG. 1. The logical connections depicted in FIG. 1 include a local area network (LAN) 1393 and a wide area network (WAN) 1395. Such networking environments are often deployed, for example, in offices, enterprise-wide computer networks, intranets, and the Internet.

When used in a LAN networking environment, the computer system 1300 is connected to the local area network 1393 through a network interface or adapter 1396. When used in a WAN networking environment, the computer system 1300 typically includes a broadband modem 1398, network gateway, or other means for establishing communications over the wide area network 1395, such as the Internet. The broadband modem 1398, which may be internal or external, is connected to the system bus 1314 via a serial port interface 1371. In a networked environment, program modules related to the computer system 1300, or portions thereof, may be stored in the remote memory storage device 1390. It is noted the network connections shown in FIG. 1 are illustrative and other means of establishing a communications link between the computers may be used depending on the specific requirements of an application of the present use of an enhanced temperature range power supply.

Figure 2:
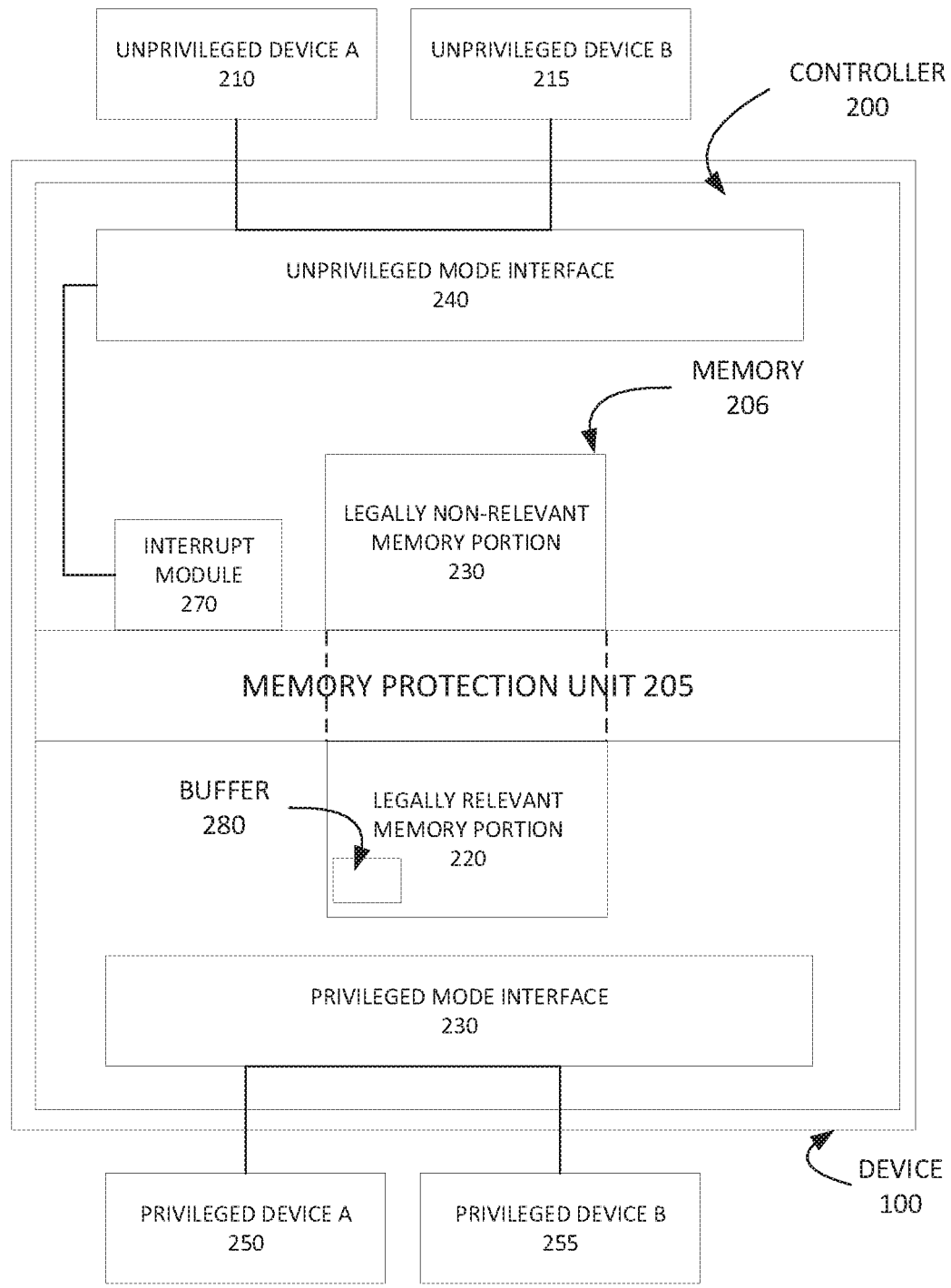
FIG. 2 is a simplified block diagram of a device that includes the memory protection unit.

FIG. 2 is a simplified block diagram of a device that includes a memory protection unit. The memory protection unit 205 is used by a device 100, in one implementation, as a basis for software separation in a single controller 200. In one example, the controller 200 can be based on an ARM® Cortex® M23 and/or M33 core as well as an ARM® Cortex® M0+, M3 and/or M4 core. In these designs, they allow the controller 205 to enforce a separation based on addresses in a memory 206.

An execution context managed by the controller 200 can be either privileged, or unprivileged. In one example, an unprivileged execution context might be initiated by unprivileged device A 210 or unprivileged device B 215. Likewise, a privileged execution context might be initiated by privileged device A 250 or privileged device B 255. It is also possible for unprivileged device A 210 or unprivileged device B 215 to initiate a privileged execution context. This may or may not be allowed by the memory protection unit 205 as will be described in more detail hereafter).

Exemplary privileged and unprivileged devices, such as devices 210, 215, 250, and 255, include but are not limited to: a P0 comm interface, a P1 comm interface, a P3 comm interface, an integrated breaker, a relay, an external metrologic chip including sensors, a metrologic LED, an LCD, a button, an external FLASH memory, a tamper sensor, a power supply, a client breaker, and a downstream voltage. In operation, when one of the devices 210, 215, 250 and 255 communicate with the device 100 they do so via the controller 200. The controller 200 includes a privileged mode interface 230 and an unprivileged mode interface 240. When one or more of unprivileged device A 210 or unprivileged device B 215 communicates with the device 100 it does so via the unprivileged mode interface 240. Similarly, when one or more of privileged device A 250 or unprivileged device B 255 communicates with the device 100 it does so via the privileged mode interface 230.

The memory protection unit 205 uses the interfaces 230 and 240 to enforce a physical separation of the memory 206 to a legally relevant memory portion 220 and a legally non-relevant memory portion 230. Unprivileged execution contexts cannot directly be granted access to the legally relevant memory portion 220 as it is possible that it could compromise the security of the device 100. For example, unprivileged device A 210 may attempt to alter the settings of the memory protection unit 205 in a privileged execution context, and thereby disable the memory protection unit 205. Table 1, for example, describes some of the actions which are allowed and/or not allowed in the various execution contexts.

TABLE 1

| Action | Privileged | Unprivileged |
|---|---|---|
| Change privilege level | Allowed | Forbidden |
| Access system registers | Allowed | Forbidden |
| Access interrupt vector table | Allowed | Forbidden |

An interrupt module 270 can be configured such that when one of the unprivileged devices 210 or 215 uses an execution context that impacts the legally relevant memory portion 220, the interrupt module can take one or more actions to handle or deny the request. In one example, the memory protection unit 205 can create a buffer in the legally relevant memory portion 220, such that the buffer is used to handle the request and the unprivileged devices 210 or 215 only receive results and aren't permitted to handle the request directly.

Figure 3:
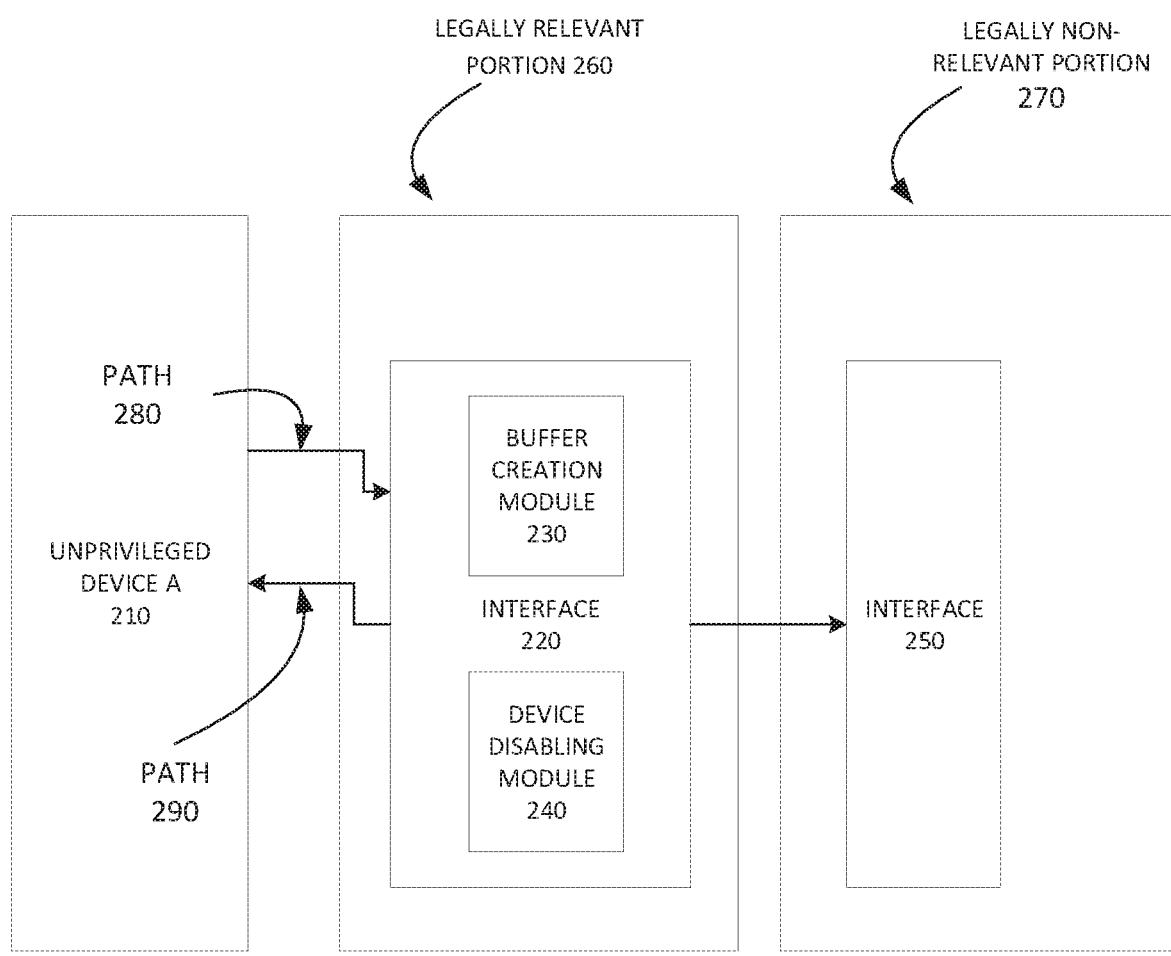
FIG. 3 is a simplified block diagram of an interrupt handler that is used by the memory protection unit.

FIG. 3 is a simplified block diagram of an interrupt handler that is used by the memory protection unit. FIG. 3 includes an unprivileged device A 210, which can attempt to interact with both a legally relevant portion 260 and a legally non-relevant portion 270. The legally relevant portion has an interface 270. The legally non-relevant portion has an interface 250. The interface 220 of the legally relevant portion 260 has a buffer creation module 230 and a device disabling module 240.

When an interrupt is made from the unprivileged device 210 it is received by the interface 220 via a communication path 280. In the case where the device is privileged (not shown), the interface 220 could directly process the interrupt in the legally relevant portion 260. If the interrupt from the unprivileged device 210 is a task that only requires using the legally non-relevant portion 270, then it can be sent for processing via interface 250. When the interrupt from the unprivileged device 210 is a task that requires using any of the legally relevant portion 260, the interface 220 can be used and it can handle it in a variety of ways in different examples.

In one example, the interface 220 merely acknowledges receipt of the request or denies the request directly via path 290. In another example, the interface 220 uses the buffer creation module 230 and the device disabling module 240. For example, it could create a new buffer in the legally relevant portion 260 and handle the code needed to execute the request there. Similarly, the interface 220 could use the device disabling module 240 to disable the unprivileged device 210 temporarily while the code is being executed. Thereafter, results can be sent back to the unprivileged device 210 from the interface 220 via the path 290.

Figure 4:
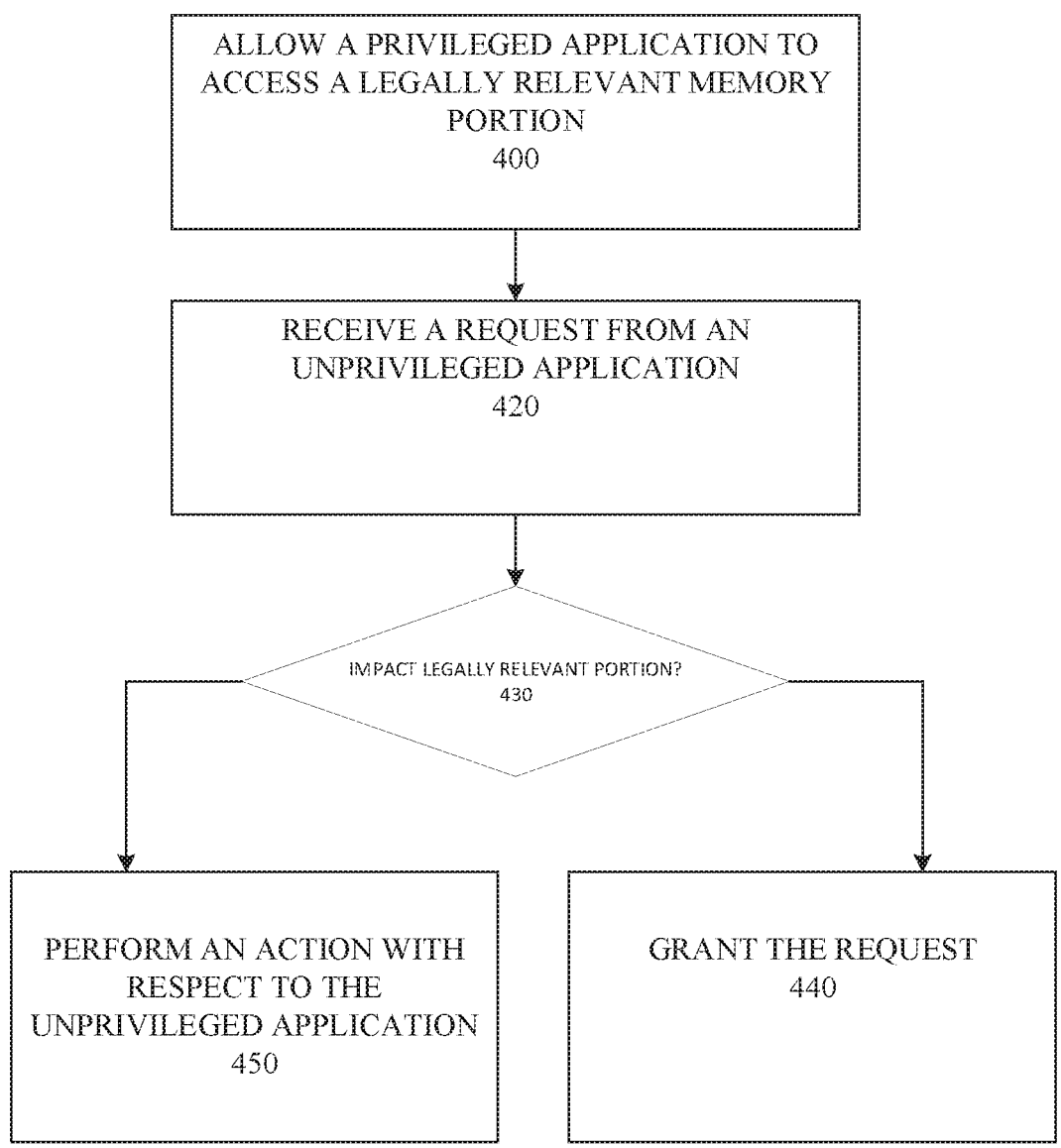
FIG. 4 is a flowchart that illustrates the present use of the memory protection unit.

FIG. 4 is a flowchart that illustrates the present use of a memory protection unit. At step 400, the memory protection unit allows privileged applications to access a legally relevant portion of memory. Thereafter, an unprivileged application requests access to the memory at step 420. Examples of unprivileged applications, include, for example, a P0 comm interface, a P1 comm interface, a P3 comm interface, an integrated breaker, a relay, an external metrologic chip including sensors, a metrologic LED, an LCD, a button, an external FLASH memory, a tamper sensor, a power supply, a client breaker, and a downstream voltage detection circuit.

At step 430, the memory protection unit determines whether the request impacts any aspect of the legally relevant portion of the memory. If it does not, the memory protection unit grants the request at step 440. Otherwise, the memory protection unit takes at least one action with respect to the request at step 450. This is designed to ensure, in one example, that the unprivileged application is not able to take an action that can compromise the security provided by the memory protection unit. See Table 1 for example, as previously discussed.

Figure 5:
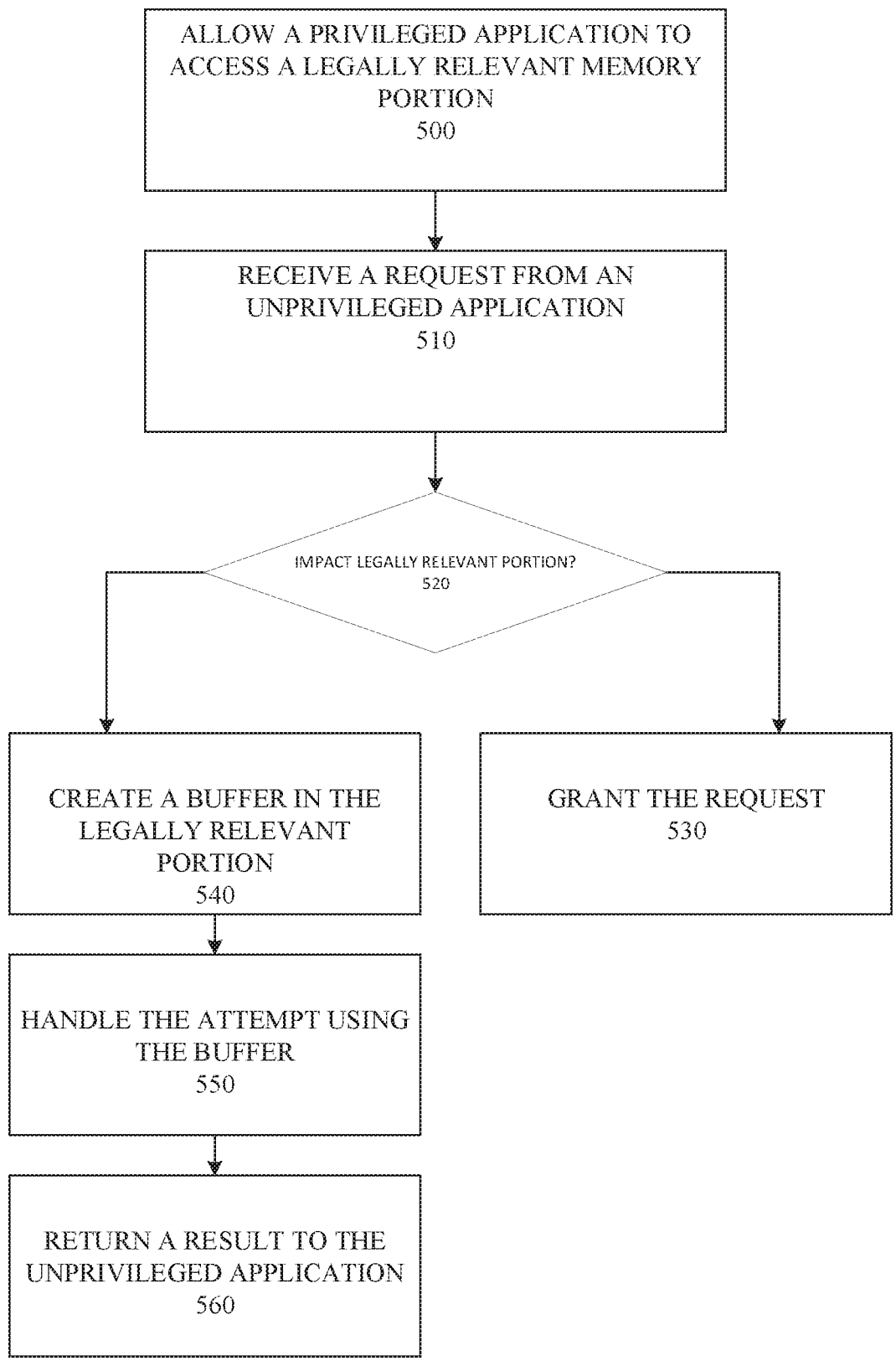
FIG. 5 is a flowchart that illustrates the present use of the memory protection unit.

FIG. 5 is a flowchart that illustrates the present use of a memory protection unit. At step 500, the memory protection unit allows privileged applications to access a legally relevant portion of memory. Thereafter, an unprivileged application requests access to the memory at step 510. Examples of unprivileged applications, include, for example, a P0 comm interface, a P1 comm interface, a P3 comm interface, an integrated breaker, a relay, an external metrologic chip including sensors, a metrologic LED, an LCD, a button, an external FLASH memory, a tamper sensor, a power supply, a client breaker, and a downstream voltage.

At step 520, the memory protection unit determines whether the request impacts any of the legally relevant portion of the memory. If it does not, the memory protection unit grants the request at step 530. Otherwise, the memory protection unit creates a buffer in the legally relevant memory portion 540. The attempt to access the legally relevant portion is handled at step 550. For example, a device can execute the code in the legally relevant portion solely via an interface or interrupt handler configured for the legally relevant portion. At step 560, results are returned to the unprivileged application.

Figure 6:
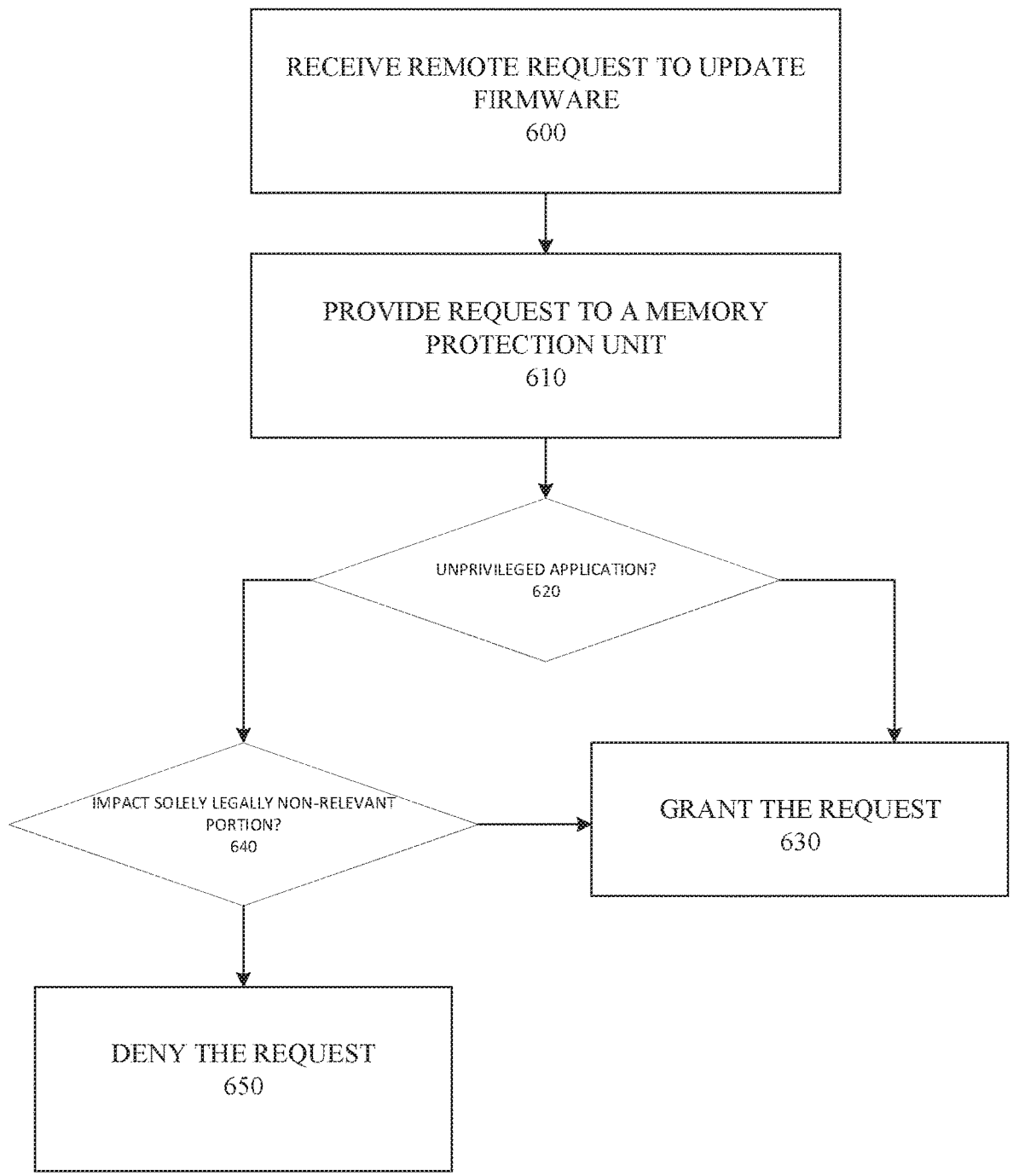
FIG. 6 is a flowchart that illustrates the present use of the memory protection unit.

FIG. 6 is a flowchart that illustrates the present use of a memory protection unit. At step 600, a device or system receives a request from a remote device or process which is requesting that it be allowed to update the firmware on the device or system. The device, thereafter, provides the request to a memory protection unit at step 610. At step 620, the memory protection unit determines whether the request is from an unprivileged application. Examples of unprivileged applications, include, for example, a P0 comm interface, a P1 comm interface, a P3 comm interface, an integrated breaker, a relay, an external metrologic chip including sensors, a metrologic LED, an LCD, a button, an external FLASH memory, a tamper sensor, a power supply, a client breaker, and a downstream voltage. If the request is not from an unprivileged application, the request is typically granted at step 630 as the application is privileged and has access to the legally relevant memory are which might be impacted by a remote firmware update. If, on the other hand, at step 620, the request is from an unprivileged application, then the memory protection unit determines at step 640, whether the request impacts solely a legally non-relevant memory area. If it does then the request is typically granted at step 630. Otherwise at step 640 the request is typically denied.

Figure 7:
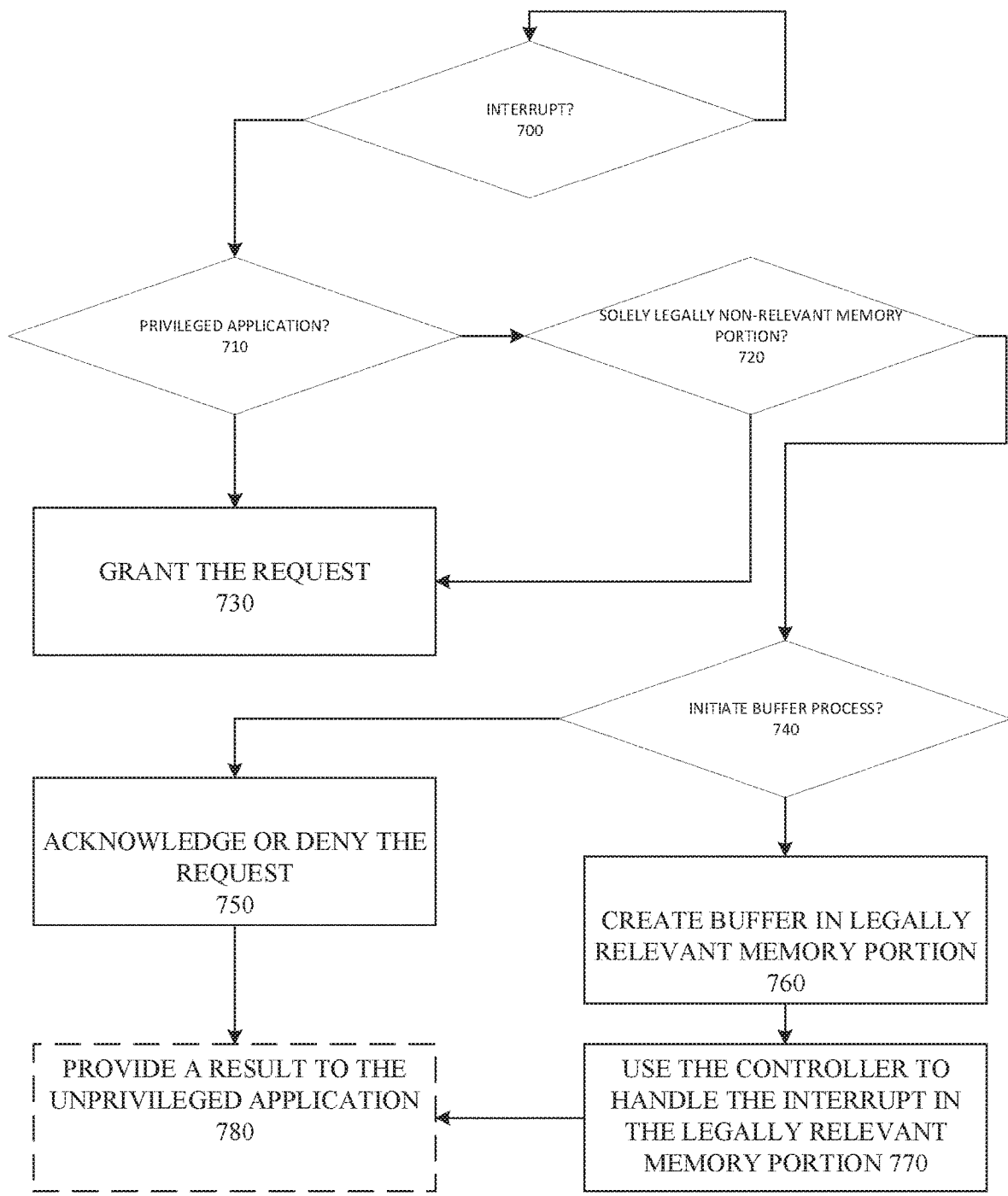
FIG. 7 is a flowchart that illustrates the present use of the memory protection unit.

FIG. 7 is a flowchart that illustrates the present use of a memory protection unit. At step 700 an operating system, computing device, or other application, executing an interrupt system, and separating it's memory into at least a legally relevant memory area and a legally non-relevant memory area, waits until an interrupt occurs at step 700. At step 710, the system determines whether the interrupt was initiated by a privileged application. If it was, the system can typically grant the request at step 730, as privileged applications typically have access to both legally relevant and legally non-relevant memory areas in the system.

On the other hand, if the interrupt was initiated by an unprivileged application at step 710, then at step 720, the system determines whether interrupt request impacts solely the legally non-relevant memory area. Examples of unprivileged applications, include, for example, a P0 comm interface, a P1 comm interface, a P3 comm interface, an integrated breaker, a relay, an external metrologic chip including sensors, a metrologic LED, an LCD, a button, an external FLASH memory, a tamper sensor, a power supply, a client breaker, and a downstream voltage.

If one of the aforementioned applications is making an attempt that doesn't impact the legally relevant memory area, flow proceeds to step 730 where the request can be granted, as the unprivileged application typically has access to the legally non-relevant memory area and associated processing. If the interrupt request impacts the legally relevant memory even partially, at step 720, then the system determines whether it needs to create a buffer in the legally relevant memory area.

If a buffer is not needed, then an option is for the system to acknowledge or deny the request at step 750 and optionally send results to the unprivileged application at step 780. When the buffer is needed, the system creates it in the legally relevant memory area at step 760 and at step 770, the system uses the controller to handle the interrupt in the legally relevant memory portion. Optionally, at step 780 the system sends results to the unprivileged application.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A device comprising:
   a controller having a memory protection unit;
   a legally relevant memory portion capable of interacting with the controller;
   a legally non-relevant memory portion capable of interacting with the controller;
   an interface in the memory protection unit that allows a privileged application to access the legally relevant memory portion and disallows an unprivileged application to access to the legally relevant memory portion;
   an interrupt system, wherein when the unprivileged application makes an attempt to interact with the legally relevant memory portion, the memory protection unit takes an action associated with the unprivileged application; and
   a buffer, created by the memory protection unit in the legally relevant portion, wherein the action includes the controller using the buffer to handle the attempt and return a result to the unprivileged application and disallow the attempt by the unprivileged application to access the legally relevant portion directly.

2. The device of claim 1, wherein the unprivileged application is selected from a group consisting of a comm interface, an integrated breaker, or a relay.

3. The device of claim 1, wherein the privileged application is selected from a group consisting of an external metrologic chip including sensors, a metrologic LED, an LCD, a button, an external FLASH memory, a tamper sensor, a power supply, a client breaker, or a downstream voltage detection circuit.

4. The device of claim 1 wherein when the controller receives a remote request to update a portion of memory, the controller enables the remote request, if the memory protection unit indicates that the remote request is solely configured for the legally non-relevant memory portion.

5. The device of claim 1 wherein when the controller receives a remote request to update a portion of memory, the controller disables the remote request, if the memory protection unit indicates that the remote request is at least partially configured for the legally relevant memory portion.

6. One or more hardware-based non-transitory memory devices storing computer-readable instructions which, when executed by the one or more processors disposed in a computing device, cause the computing device to:
   enable an interaction between a controller and a legally relevant portion using a memory protection unit;
   enable an interaction between the controller and a legally non-relevant portion using the memory protection unit;
   allow a privileged application to access the legally relevant portion using an interface in the memory protection unit;
   receive an attempt from the unprivileged application to access the legally relevant portion; and
   perform at least one action with respect to the unprivileged application,
   creating a buffer in the legally relevant portion; and
   using the buffer to handle the attempt and returning a result to the unprivileged application and disallow the attempt by the unprivileged application to handle the legally relevant portion directly.

7. The one or more hardware-based non-transitory memory devices of claim 6 wherein the at least one action further comprises denying a privileged application to access the legally relevant portion.

8. The one or more hardware-based non-transitory memory devices of claim 6 wherein the unprivileged application is selected from a group consisting of a comm interface, an integrated breaker, or a relay.

9. The one or more hardware-based non-transitory memory devices of claim 6 wherein the privileged application is selected from a group consisting of an external metrologic chip including sensors, a metrologic LED, an LCD, a button, an external FLASH memory, a tamper sensor, a power supply, a client breaker, or a downstream voltage detection circuit.

10. The one or more hardware-based non-transitory memory devices of claim 6 wherein the at least one action occurs in response to the controller receiving a remote request to update a portion of memory, the at least one action further comprising the controller enabling the remote request, if the memory protection unit indicates that the remote request is solely configured for the legally non-relevant memory portion.

11. The one or more hardware-based non-transitory memory devices of claim 6 wherein the at least one action occurs in response to the controller receiving a remote request to update a portion of memory, the at least one action further comprising the controller disabling the remote request, if the memory protection unit indicates that the remote request is at least partially configured for the legally relevant memory portion.

12. A method for protecting a device comprising:
   enabling an interaction between a controller and a legally relevant portion using a memory protection unit;
   enabling an interaction between the controller and a legally non-relevant portion using the memory protection unit;
   allowing a privileged application to access the legally relevant portion;
   receiving an interrupt from an unprivileged application configured to interact with the legally relevant portion; and
   performing an operating system level response to the interrupt, wherein the step of performing further comprises:
      creating a buffer by the memory protection unit in the legally relevant portion; and
      using the buffer to handle the interrupt and returning a result to the unprivileged application and disallow the attempt by the unprivileged application to access the legally relevant portion directly.

13. The method of claim 12 wherein the unprivileged application is selected from a group consisting of a comm interface, an integrated breaker, or a relay.

14. The method of claim 12 wherein the privileged application is selected from a group consisting of an external metrologic chip including sensors, a metrologic LED, an LCD, a button, an external FLASH memory, a tamper sensor, a power supply, a client breaker, or a downstream voltage detection circuit.

\* \* \* \* \*